(12) United States Patent
An et al.

(10) Patent No.: US 9,403,488 B1
(45) Date of Patent: Aug. 2, 2016

(54) INSTRUMENT PANEL ASSEMBLY AND METHOD OF ASSEMBLING AN INSTRUMENT PANEL ASSEMBLY

(71) Applicant: Toyota Motor Engineering & Manufacturing North America, Inc., Erlanger, KY (US)

(72) Inventors: Chae Hon An, Northville, MI (US); Jonathan Joseph Quijano, Ann Arbor, MI (US); James L. Belanger, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 28 days.

(21) Appl. No.: 14/592,521

(22) Filed: Jan. 8, 2015

(51) Int. Cl.
*B60R 11/00* (2006.01)
*B60R 11/02* (2006.01)
*B60K 37/02* (2006.01)

(52) U.S. Cl.
CPC ............... *B60R 11/02* (2013.01); *B60K 37/02* (2013.01); *B60K 2350/2086* (2013.01); *B60K 2350/941* (2013.01); *B60R 2011/0005* (2013.01); *B60R 2011/0064* (2013.01)

(58) Field of Classification Search
CPC ............................... B60R 11/02; B60K 37/02
USPC ........................................ 296/70, 72; 180/90
See application file for complete search history.

(56) References Cited

U.S. PATENT DOCUMENTS

| 4,911,386 | A | 3/1990 | Putman et al. |
| 6,529,381 | B1* | 3/2003 | Schoenfish .......... H05K 5/0204 211/71.01 |
| 7,077,452 | B2 | 7/2006 | Song |
| 7,819,456 | B2 | 10/2010 | Robertson |
| 7,874,587 | B2 | 1/2011 | Miki et al. |
| 7,946,640 | B2 | 5/2011 | Sato |
| 9,022,450 | B1* | 5/2015 | Eberlein ................ B62D 25/14 296/1.08 |
| 2006/0283643 | A1 | 12/2006 | Simonds et al. |
| 2013/0058014 | A1* | 3/2013 | King, II .............. B60R 11/0211 361/679.01 |

FOREIGN PATENT DOCUMENTS

| CN | 202827169 U | 3/2013 |
| CN | 203047083 U | 7/2013 |

* cited by examiner

*Primary Examiner* — Joseph D Pape
(74) *Attorney, Agent, or Firm* — Dinsmore & Shohl LLP (57) ABSTRACT

An instrument panel assembly and method for assembling an instrument panel assembly are provided. The instrument panel assembly and method of assembling is configured so as to center a front face of an electrical component within a second opening of a cover. The method and instrument panel assembly utilize a deformable rib configured to set the angular position of the front face of the electrical component by adjusting an alignment hole of a bracket to fit the widened rib. Thus, the instrument panel may be manufactured in a repeatable manner so as to allow for the mass production of instrument panel assemblies wherein the front face of the electrical component is centered with respect to the second opening of the cover.

16 Claims, 7 Drawing Sheets

INSTRUMENT PANEL ASSEMBLY AND METHOD OF ASSEMBLING AN INSTRUMENT PANEL ASSEMBLY

TECHNICAL FIELD

A method for assembling an instrument panel assembly so as to align a cover with a front face of an electrical component and an instrument panel assembly is provided.

BACKGROUND OF THE INVENTION

Instrument panel assemblies include openings configured to house an electrical component such as a radio or a navigational system. The instrument panel assemblies further include a cover. The cover includes a plurality of openings so as to accommodate various vehicle components such as the air duct and the front face of the electrical component. The covers are attached to various points of the instrument panel utilizing a snap fit engagement.

The electrical component is typically mounted to the instrument panel by brackets. The brackets have a through hole for which a screw shot may be made so as to secure the bracket to the instrument panel and position the electrical component within the opening. However, the through holes are typically larger in diameter than the screw and thus provides a gap. The gap presents a tolerance with respect to the position of the electrical component within the opening of the instrument panel.

The use of a plurality of snap fit attachment features provides a relatively lower tolerance in terms of the position of the cover with respect to the instrument panel. Thus, there may be instances where the front face of the electrical component is not centered within the opening of the cover.

In instances where the front face of the electrical component is misaligned with respect to the opening of the cover, the installer must remove the front face and disengage the screws and manually position the front face of the electrical component so as to be centered within the opening of the cover. Accordingly, it remains desirable to have a bracket wherein the bracket may be tuned so as to properly position the front face of the electrical component within the opening of the cover.

SUMMARY OF THE INVENTION

An instrument panel assembly is provided. The instrument panel assembly includes an instrument panel. The instrument panel has a first opening. The first opening is configured to house an electrical component such as a as a multimedia device, a radio or a navigational system. The electrical component includes a front face having a display. The instrument panel includes a rib. The rib extends outwardly from the instrument panel and includes a pair of opposing side edges so as to define a width.

The instrument panel assembly includes a cover. The cover has a second opening dimensioned to bound the peripheral edges of the front face of the electrical component.

A first bracket is configured to attach the electrical component to the instrument panel. The first bracket includes at least one attachment structure. The attachment structure includes a through hole configured to register with a corresponding through hole of the instrument panel so as to support a screw shot securing the first bracket to the instrument panel. The first bracket further includes an alignment hole. The alignment hole is configured to engage the opposing side edges of the rib.

The rib may be widened so as to rotate the position of the front face of the electrical component with respect to the second opening of the cover. Thus, the front face of the electrical component may be centered with respect to the second opening of the cover. The rib may include a body and a pair of wings disposed on opposite sides of the body. One of the pair of wings may be widened so as to widen the rib requiring the first bracket to be rotated to fit the rib within the alignment hole which in turn rotates the front face of the electrical component within the first opening so as to center the front face of the electrical component with respect to the second opening of the cover.

A method for mass assembly of an instrument panel assembly is also provided. The method utilizes a tunable rib and a bracket so as to center the front face of an electrical component within a second opening of a cover. The method includes the step of providing an instrument panel assembly having an instrument panel and a cover. The instrument panel has a first opening configured to house an electrical component, such as a multimedia device, a radio or a navigational system. The electrical component includes a display. The display is disposed on a front face of the electrical component.

The cover includes a second opening dimensioned to bound the front face of the electrical component. The method includes the step of providing a first bracket. The first bracket has at least one attachment structure and an alignment hole. The attachment structure is configured to attach to the instrument panel.

The method proceeds to the step of mounting the electrical component to the first bracket and attaching the first bracket to the instrument panel so as to place the electrical component within the first opening.

The method includes the step of providing a rib on the instrument panel. The rib has a pair of opposing side edges so as to define a width. The method proceeds to the step of mounting the cover on the instrument panel and determining if the second opening of the cover is centered with the front face of the electrical component. The width of the rib is lengthened when the second opening is misaligned with the front face of the electrical component so as to center the second opening with respect to the front face of the electrical component.

The rib may include a body extending outwardly from an exterior surface of the instrument panel. The rib includes a pair of wings disposed on opposite sides of the body. The rib is formed of a material suitable for the injection molding process. One of the pair of wings may be widened so as to rotate the front face of the electrical component clockwise and the other of the pair of wings may be widened so as to rotate the front face of the electrical component counterclockwise. Thus, the user may center the front face with respect to the second opening by widening the rib so as to rotate the front face either clockwise or counterclockwise as needed. Thus, any further instrument panels made will have a rib which positions the first bracket in such a manner as to center the front face of the electrical component within the second opening of the cover.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

An instrument panel assembly and method for assembling an instrument panel assembly are provided. The instrument panel assembly and method of assembling is configured so as to center a front face of an electrical component within a second opening of a cover. The method and instrument panel assembly utilize a deformable rib configured to set the angular position of the front face of the electrical component with respect to the instrument panel in a repeatable manner so as to allow for the mass production of instrument panel assemblies wherein the front face of the electrical component is centered with respect to the second opening of the cover.

The instrument panel assembly includes an instrument panel and a cover. The instrument panel includes a first opening configured to house an electrical component such as a multimedia device, a radio or a navigational system. The electrical component includes a display. The cover is mounted onto the instrument panel and includes a second opening. The front face of the electrical component is fitted within the second opening of the cover. The peripheral edge of the front face and an inner peripheral wall forming the second opening of the cover are spaced apart from each other so as to provide an aesthetic line. It should be appreciated that the instrument panel assembly may appear to be hastily made in instances where the front face of the electrical component is not centered within the second opening of the cover.

The method includes the step of providing a first bracket. The first bracket a first portion configured to mount to the instrument panel and a second portion configured to attach to the electrical component. The first bracket includes an attachment structure having a through hole and an alignment hole. The attachment structure is configured to attach to the instrument panel. The alignment hole is adjacent the through hole.

The method proceeds to mounting the electrical component to the first bracket so as to place the front face of the electrical component within the first opening of the instrument panel. The method includes the step of providing a rib on the instrument panel. The rib includes a pair of opposing side edges so as to define a width. The first bracket is attached to the instrument panel using a fastening device which is passed through the through hole of the first bracket and a corresponding through hole of the instrument panel. The alignment hole is mounted onto the rib.

The method includes the step of mounting the cover on the instrument panel, wherein the second opening of the cover is mounted over the front face of the electrical component. The method proceeds to the step of determining if the front face of the electrical component is centered within the second opening of the cover. The method proceeds to lengthening the width of the rib when the front face of the electrical component is not centered within the second opening of the cover. The lengthened rib requires the first bracket to be rotated so as to fit the alignment hole onto the lengthened rib which in turn centers the front face of the electrical component with respect to the second opening.

Thus, it should be appreciated that once the rib is properly dimensioned the rib may be reproduced in subsequent injection molding processes so as to repeat the same configuration and ensure that the subsequent instrument panel assemblies are formed with the front face of the electrical component centered within the second opening of the cover.

Figure 1:
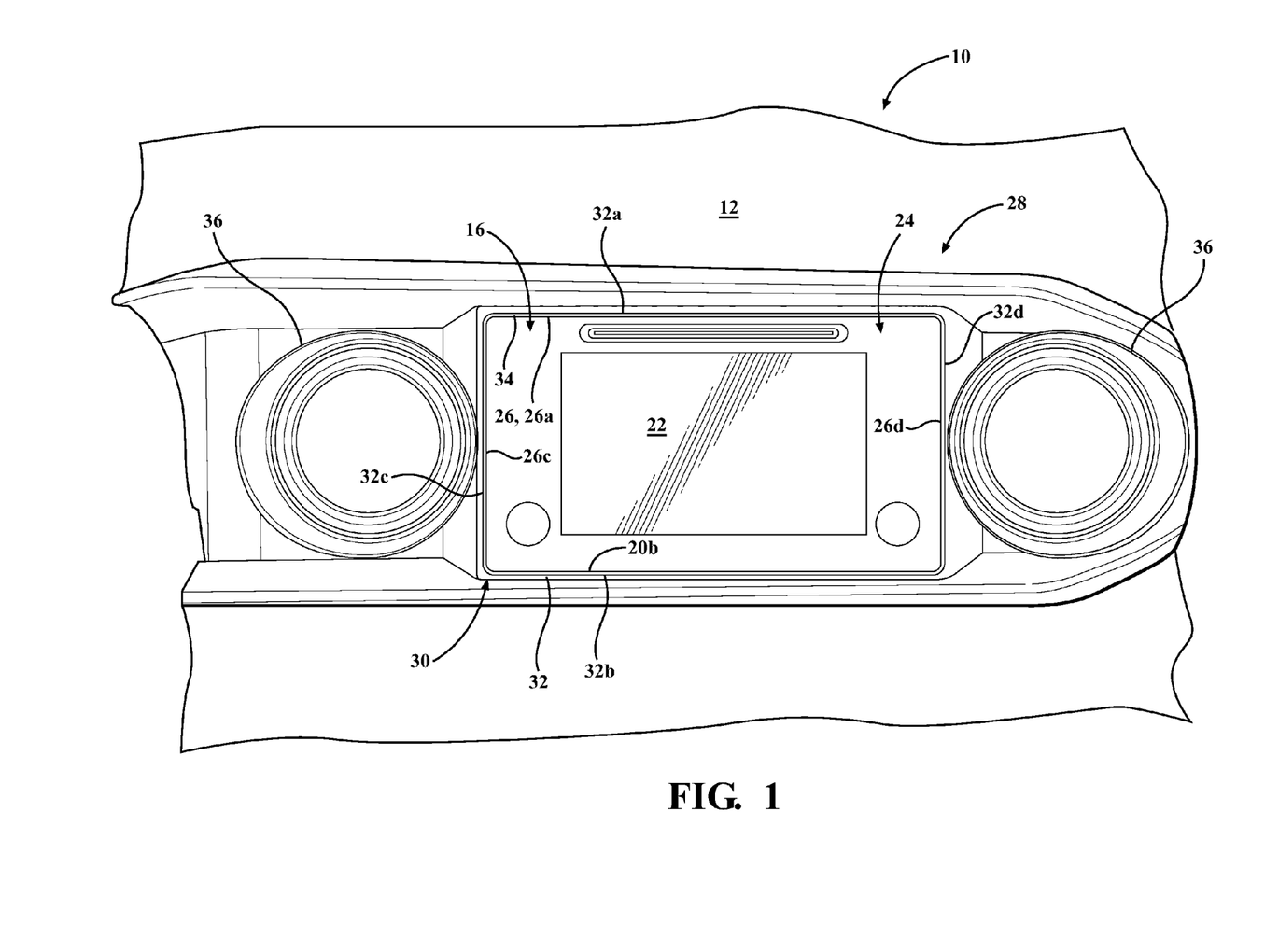
FIG. 1 is a perspective view of the instrument panel assembly.

With reference now to FIG. 1, a frontal view of an instrument panel assembly 10 is provided. The instrument panel assembly 10 includes an instrument panel 12. The instrument panel 12 may be mounted to the cabin space of an automotive vehicle (not shown). The instrument panel 12 includes a first opening 14 configured to hold an electrical component 16. The instrument panel 12 further includes supplemental openings 18 to house automotive components such as air ducts.

The electrical component 16 may be a multimedia device configured to provide audio, navigational, and video function to the user. The electrical component 16 includes a housing 20, a display 22 and a front face 24. The display 22 is disposed on the front face 24 of the electrical component 16. The front face 24 has peripheral edge 26. The peripheral edge 26 includes a top peripheral edge 26a, bottom peripheral edge 26b and a pair of spaced apart peripheral side edges 26c, 26d so as to from a generally rectangular dimension. The electrical component 16 is shown as a multimedia device configured to display information associated with the various systems of the vehicle, to include radio, navigation, climate control and the like.

A cover 28 is mounted to the instrument panel 12. The cover 28 includes a second opening 30. The second opening 30 is generally rectangular and is dimensioned to bound the peripheral edge 26 of the front face 24 of the electrical component 16. The peripheral edge 26 of the front face 24 is spaced apart from an inner edge 32 defining the second opening 30 so as to form an aesthetic line 34 visible to the occupants of the cabin.

The cover 28 may include additional openings 36 configured to house other vehicle components such as duct openings. The cover 28 mounts onto the instrument panel 12 and provides an aesthetic appeal to the passengers by hiding various attachment features which would otherwise be seen. The second opening 30 of the cover 28 is configured to be evenly spaced apart from the peripheral edge 26 of the front face 24 of the multimedia device so as to form a straight aesthetic line 34.

The second opening 30 includes a top inner edge 32a, bottom inner edge 32b and a pair of spaced apart inner side edges 32c, 32d forming a generally rectangular dimension. The top inner edge 32a, bottom inner edge 32b and inner side edges 32c, 32d are spaced apart from a corresponding top peripheral edge 26a, bottom peripheral edge 26b and peripheral side edges 26c, 26d so as to form the aesthetic line 34 surrounding the peripheral edge 26 of the front face 24. Thus it should be appreciated that if the front face 24 of the electrical component 16 is skewed within the bounds of the second opening 30 the instrument panel assembly 10 may appear to be hastily and poorly assembled.

Figure 2:
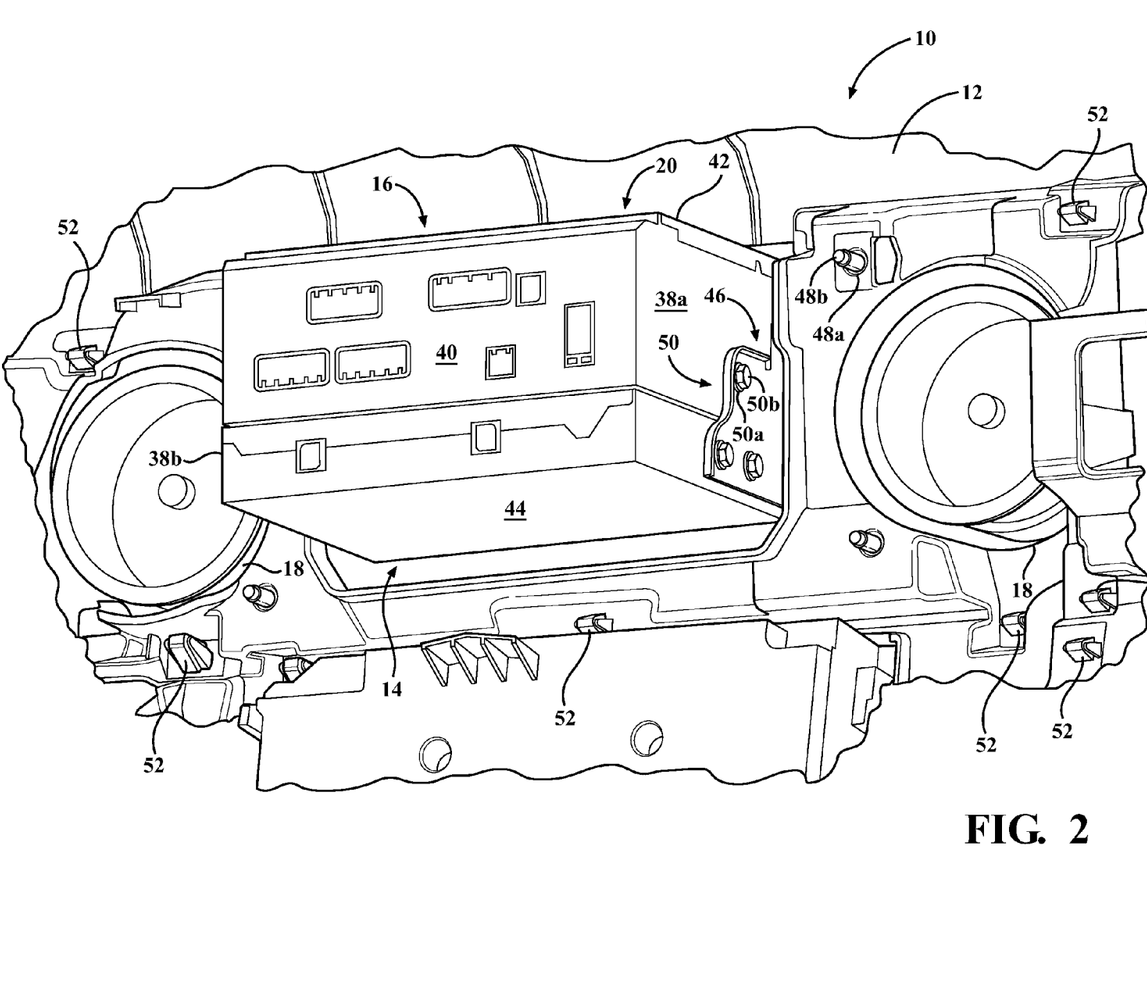
FIG. 2 is a perspective view showing the back side of the instrument panel assembly.

With reference now to FIG. 2, a perspective view taken from the back of the instrument panel 12 is provided. The electrical component 16 is shown mounted within the first opening 14 of the instrument panel 12. The housing 20 includes a pair of side walls 38a, 38b, a back wall 40, a top wall 42 and bottom wall 44. FIG. 2 shows the first bracket 46 attached to the side wall 38 of the housing 20.

Figure 5:
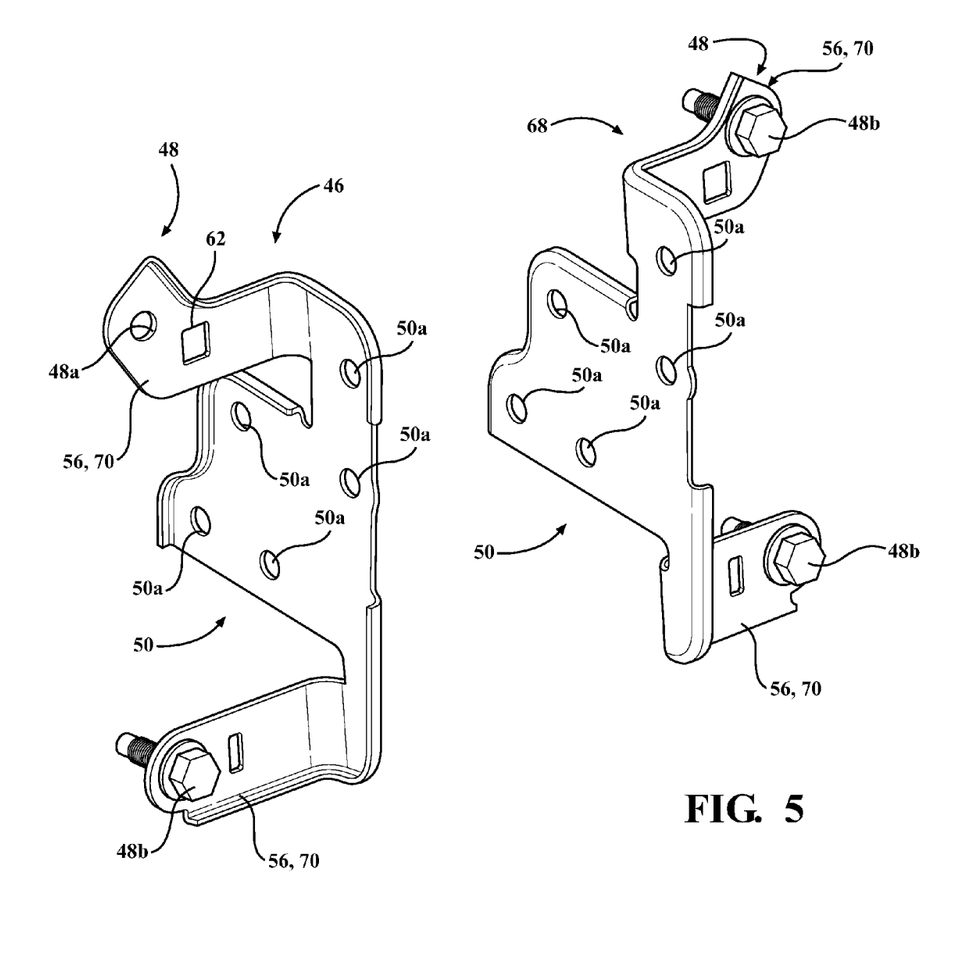
FIG. 5 is an isolated view of the first bracket.

With reference again to FIG. 2 and also to FIG. 5, the first bracket 46 includes a first portion 48 and a second portion 50. The first portion 48 is configured to attach the first bracket 46 to the instrument panel 12. The second portion 50 is configured to attach the first bracket 46 to the electrical component 16. The first bracket 46 supports the electrical component 16 within the first opening 14 of the instrument panel 12. The second portion 50 of the first bracket 46 includes a plurality of through holes 50a for which a plurality of fastening devices 50b may be registered and fixed to the side wall 38 of the electrical component 16 so as to secure the electrical component 16 to the first bracket 46.

Figure 3:
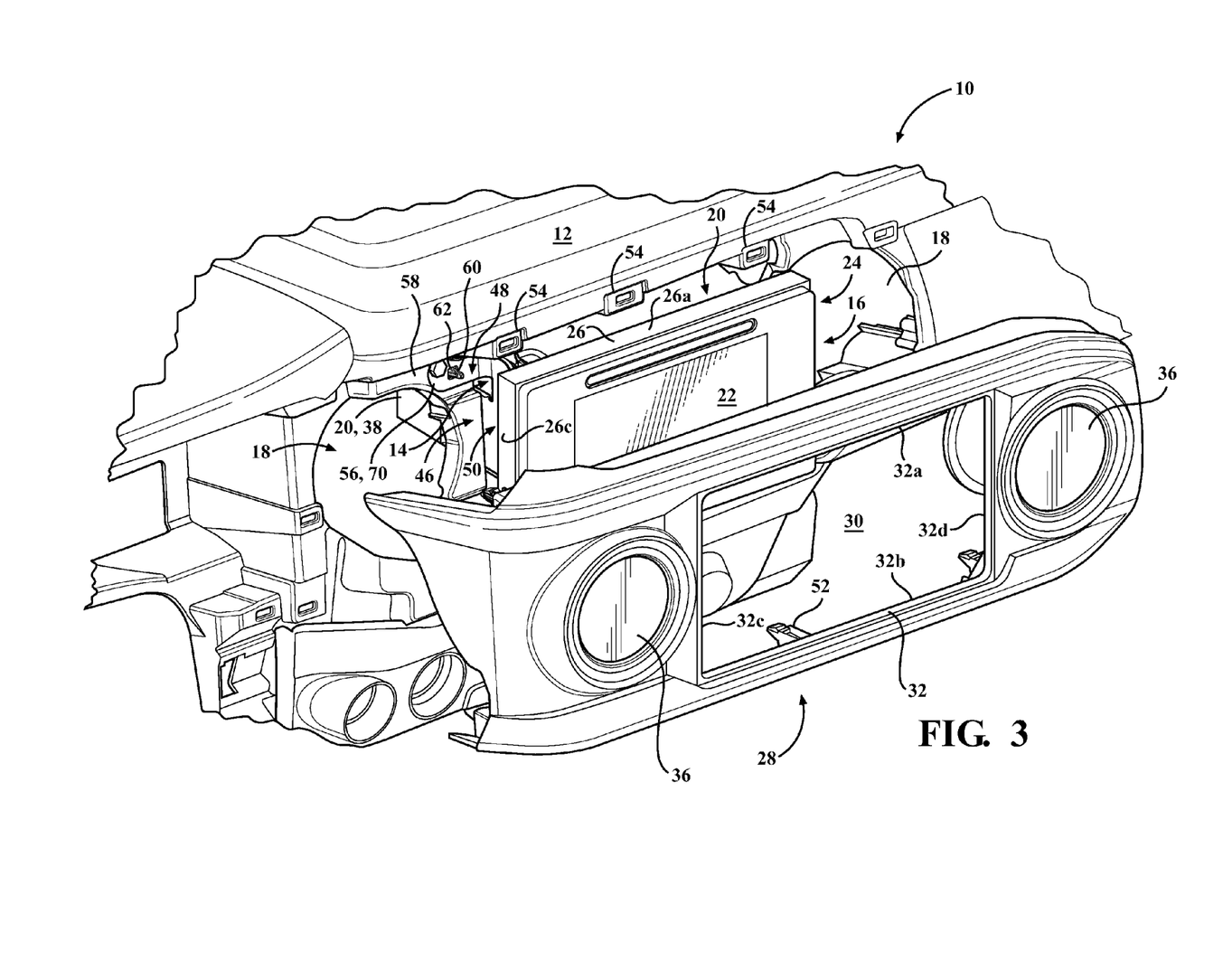
FIG. 3 is a perspective view of FIG. 1 showing the cover removed.

With reference again to FIG. 2, the first portion 48 of the first bracket 46 is hidden from view, but a screw 48b attaching the first portion 48 of the bracket to the instrument panel 12 is shown protruding outwardly from a back surface of the instrument panel 12. FIG. 3 also shows a plurality of snap-fit engagements 52 projecting outwardly from the back surface of the instrument panel 12. The snap-fit engagements 52 are disposed on the cover 28 and secure the cover 28 to the instrument panel 12. It should be appreciated that the snap-fit engagements 52 provide for a small tolerance in assembly, meaning that in the mass production of the instrument panel assembly 10, the cover 28 is repeatedly mounted to the same position with respect to the instrument panel 12 with a very small degree of variation.

With reference now to FIG. 3, an exploded view of the instrument panel assembly 10 is provided. The cover 28 is displaced from the instrument panel 12. The outer surface of the instrument panel 12 includes a plurality of snap-fit receiving holes 54. The electrical component 16 is shown mounted within the first opening 14 of the instrument panel 12. The cover 28 includes a plurality of snap-fit engagements 52 disposed on the back surface of the cover 28. The snap-fit engagements 52 are configured to engage corresponding snap-fit receiving holes 54 of the instrument panel 12.

Figure 4:
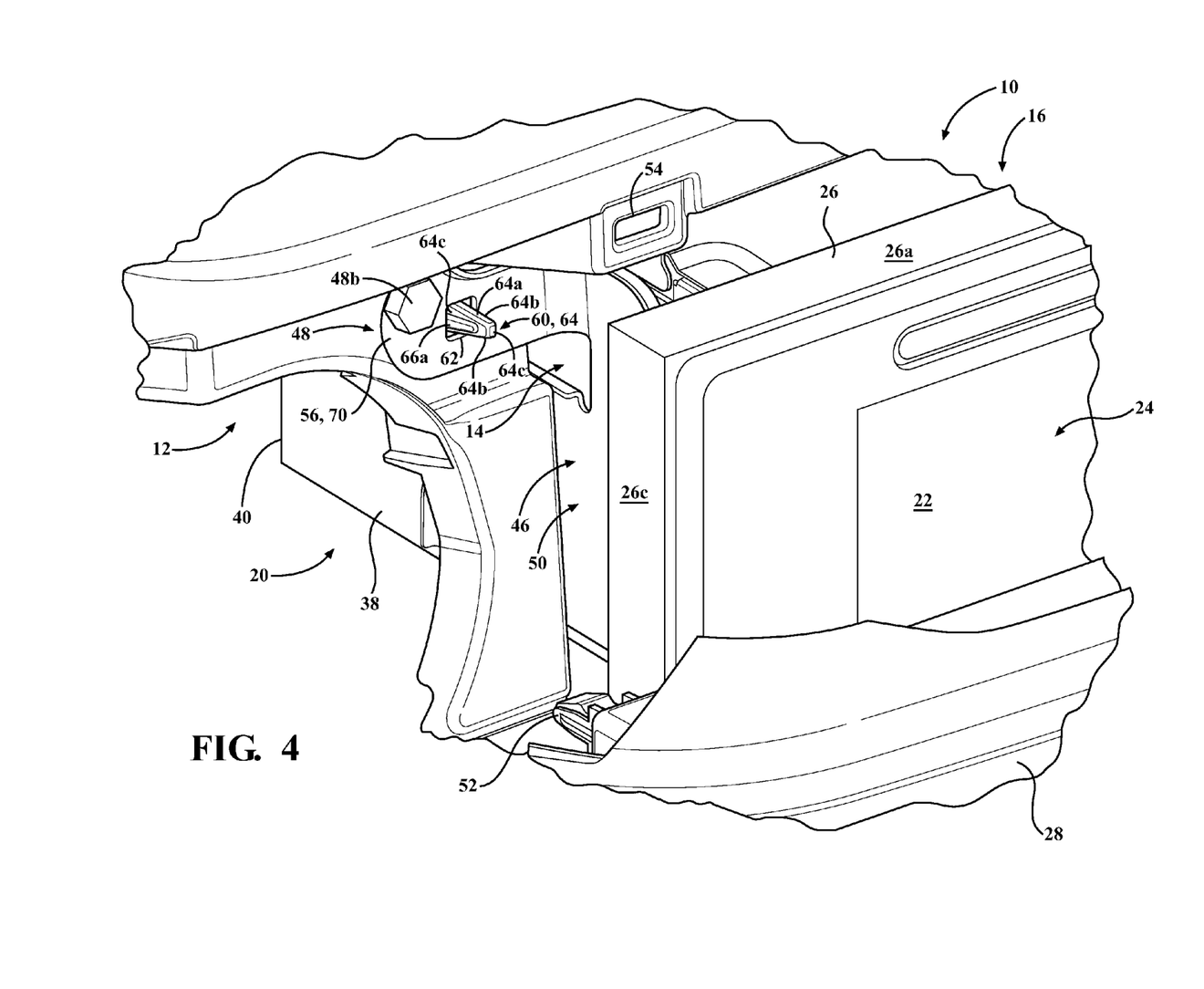
FIG. 4 is an isolated view of the first bracket showing the rib.

With reference now to FIG. 4, a close up view showing the first bracket 46 attached to the instrument panel 12 is provided. The first portion 48 of the first bracket 46 is shown having an attachment structure 56. The attachment structure 56 is pressed against a support surface 58 of the instrument panel 12. A fastening device 48b, shown as a threaded bolt is mounted to the through hole 48a (shown in FIG. 5), securing the first bracket 46 to the instrument panel 12.

The rib 60 is shown projecting through the alignment hole 62. The rib 60 is made of a material suitable for use in the injection molding process. Any material currently known and used in the art for injection molding processes may be adapted for use herein, illustratively including thermoplastic and thermosetting polymers. The rib 60 includes a pair of opposing side edges 60a, 60b defining the width of the rib 60. As shown, the rib 60 includes a body 64 having a first slanted surface 64a and a second slanted surface 64b. The first and second slanted surfaces 64a, 64b extend between a pair of side walls 64c, 64d. An end wall 64e forms the end of the rib 60. A pair of wings 66a, 66b are formed on respective side walls 38 of the rib 60. The wings 66a, 66b have a length which is shorter than the length of the side walls 38 and have a width as measured along the X axis. The peripheral edge 26 of the alignment hole 62 may touch up against respective side edges of the wings 66a, 66b.

With reference now to FIG. 5, a first and a second bracket 46, 68 are provided. The first and second brackets 46, 68 may be formed a durable and rigid material such as steel. The first and second brackets are 46, 68 configured to engage respective side walls 38 of the electrical component 16. Both the first and second brackets 46, 68 have a second portion 50 which is generally orthogonal to the first portion 48. The second portion 50 includes a plurality of through holes 50a configured to attach the second portion 50 of the first and second brackets 46, 68 to respective side walls 38 of the housing 20 of the electrical component 16.

The attachment structure 56 is disposed on each of the first portion 48 of each of the first and second brackets 46, 68, and is shown as a pair of legs 70 extending generally orthogonal from the second portion 50. The distal end of each of the legs 70 includes through hole 48a for which a screw 48b may be shot through so as to attach the respective first and second brackets 46, 68 to the instrument panel 12. The first bracket 46 includes an alignment hole 62. The alignment hole 62 is shown adjacent the through hole 48a of the upper leg of the first bracket 46. The alignment hole 62 is generally rectangular.

Figures 6, 7, 8:
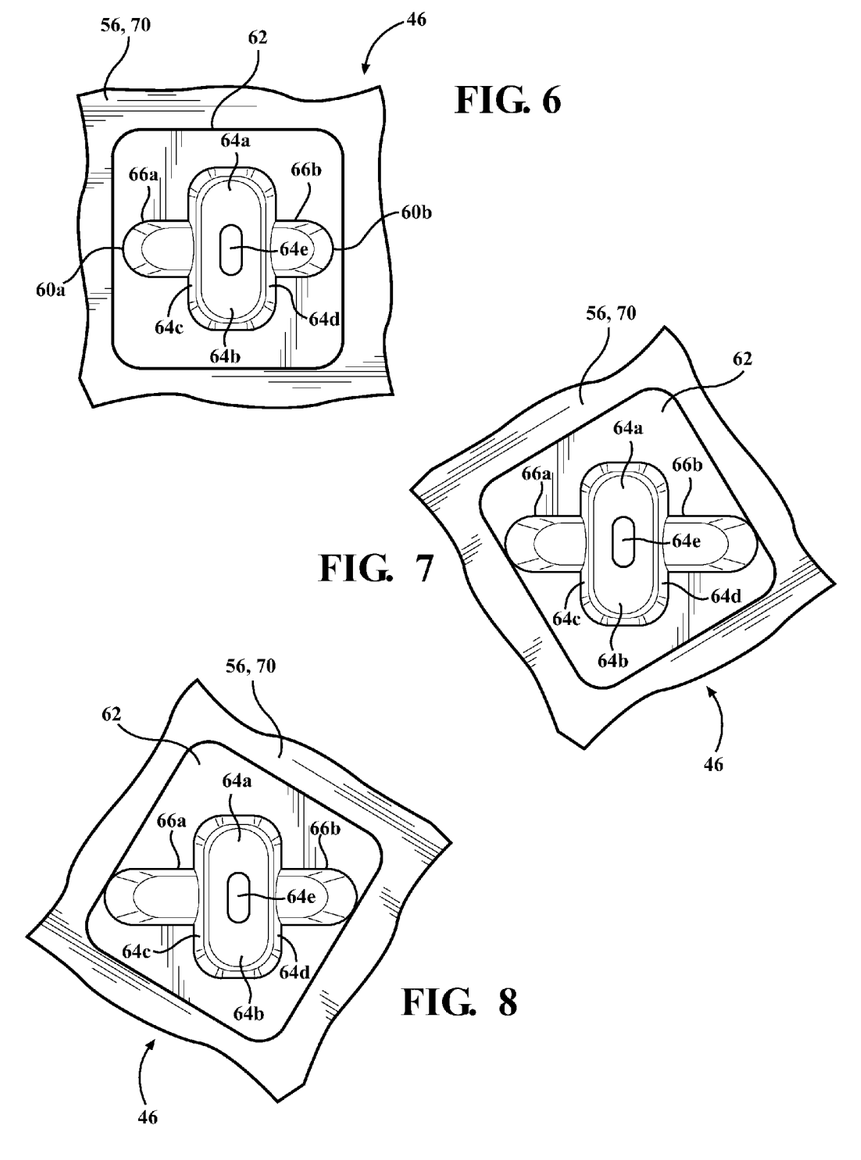
FIG. 6 is a view showing the rib engaged within the alignment hole.
FIG. 7 is a perspective view showing one of the side wings lengthened and the rotation of the second hole.
FIG. 8 is a perspective view showing the other of the pair of wings lengthened.

With reference now to FIG. 6, a close up view of the first bracket 46 showing the alignment hole 62 and the rib 60 is provided. The alignment hole 62 is generally rectangular. The rib 60 is made of a material suitable for use in the injection molding process. Any material currently known and used in the art for injection molding processes may be adapted for use herein, illustratively including thermoplastic and thermosetting polymers. With reference now to FIG. 7, an illustrative view of FIG. 6 is provided wherein wing 66b is widened. As shown, widening the wing 66b requires the user to rotate the first bracket 46 so as to fit the alignment hole 62 within the widened rib 60 which in turn adjusts the angular position of the front face 24 so as to center the front face 24 in a counterclockwise position if needed whereas FIG. 8 shows the wing 66a being widened so as to rotate the front face 24 of the electrical component 16 in a clockwise manner. It should be appreciated FIGS. 6-8 are provided for illustrative and teaching purposes and that the alignment hole 62 and the widening of the wing 66a, 66b is not limited to the dimensions of the wings 66a, 66b or the angular position of the alignment hole 62 shown.

Figure 9:
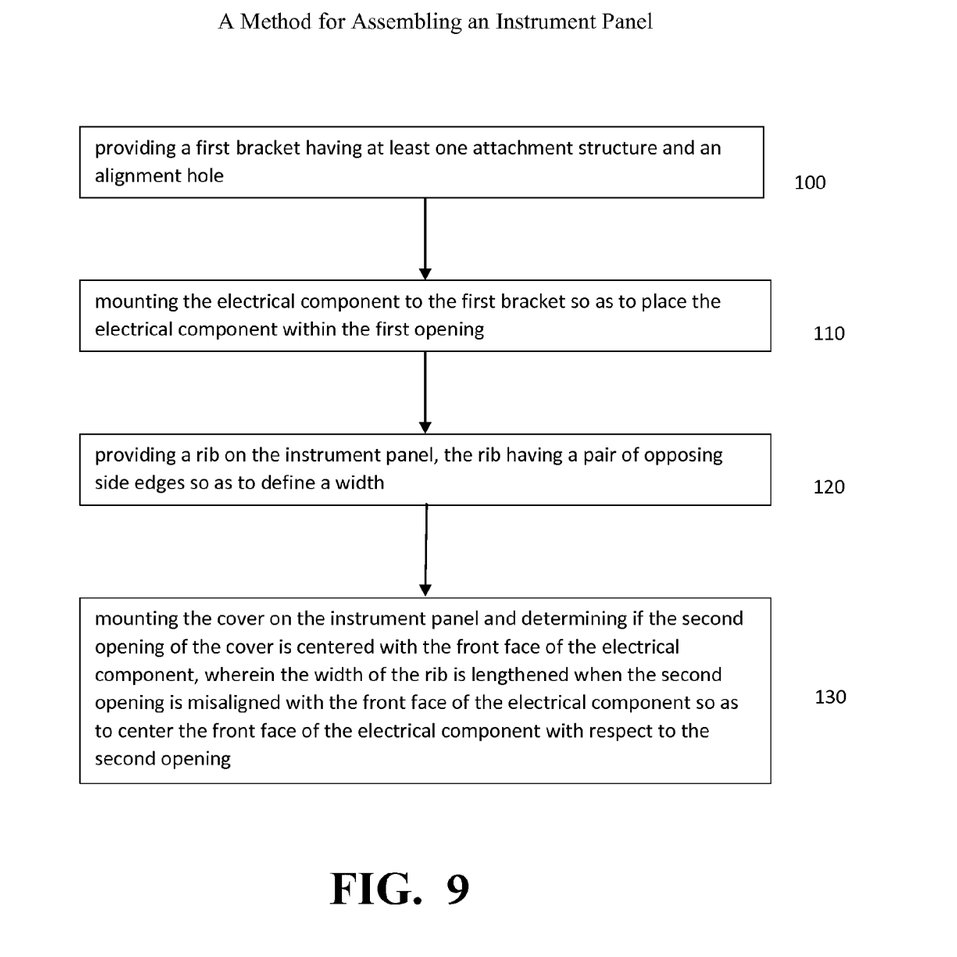
FIG. 9 is a diagram showing the steps for a method of assembling an instrument panel assembly.

With reference now to FIG. 9, a diagram showing a method for assembling an instrument panel assembly 10 wherein the front face 24 of an electrical component 16 is centered within a second opening 30 of a cover 28 is provided. The instrument panel assembly 10 includes an instrument panel 12 and a cover 28. The instrument panel 12 includes a first opening 14 configured to house an electrical component 16. The electrical component 16 has a display 22. The cover 28 has a second opening 30 dimensioned to bound a front face 24 of the electrical component 16.

The method includes step 100, providing a first bracket 46. The first bracket 46 has at least one attachment structure 56 and an alignment hole 62. The attachment structure 56 is configured to attach to the instrument panel 12 and also the electrical component 16. The method includes step 110, mounting the electrical component 16 to the first bracket 46 and attaching the first bracket 46 to the instrument panel 12 so as to place the electrical component 16 within the first opening 14.

The method includes the step 120, providing a rib 60 on the instrument panel 12. The rib 60 includes a pair of opposing side edges 60a, 60b defining the width of the rib 60. The rib 60 is made of a material suitable for use in an injection molding process. The rib 60 includes a body 64 having a first slanted surface 64a and a second slanted surface 64b. The first and second slanted surfaces 64a, 64b extend between a pair of side walls 64c, 64d. An end wall 64e forms the end of the rib 60. A pair of wings 66a, 66b are formed on respective side walls 38 of the rib 60. The wings 66a, 66b have a length which is shorter than the length of the side walls 38 and have a width as measured along the X axis. The peripheral edge 26 of the alignment hole 62 may touch up against respective side edges 60a, 60b of the wings 66a, 66b. The end wall 64e encloses an end portion of the body 64. Thus, the wings 66a, 66b of the rib 60 may be lengthened or widened by use of a tool which may apply a heat treatment to the mold so as to widen the rib 60.

The method proceeds to step 130, mounting the cover 28 on the instrument panel 12 and determining if the front face 24 of the electrical component 16 is centered within the second opening 30 of the cover 28 wherein the width of the rib 60 is lengthened when the front face 24 of the electrical component 16 is misaligned with respect to the second opening 30 so as to center the front face 24 of the electrical component 16 within the second opening 30 of the cover 28.

It should be understood that lengthening the width of the rib 60 adjusts the angular position of the front face 24 of the electrical component 16 by positioning the first bracket 46. Specifically, the leg of the first bracket 46 must rotated about a first screw shot so as allow the alignment hole 62 to fittingly engage the widened wing. It should be further appreciated that as the subsequent instrument panel 12s are formed through the injection molding process the widened rib 60 will accommodate the tolerances of that particular machine so as to ensure that subsequent first bracket 46s are properly positioned thus ensuring that the electrical component 16 is properly centered within the cover 28 of the instrument panel assembly 10.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

The invention claimed is:

1. An instrument panel assembly comprising:
    an instrument panel, the instrument panel having a first opening and a rib, the first opening configured to house an electrical component, the electrical component having a front face and a display mounted on the front face, the rib extending outwardly from the instrument panel, the rib having a pair of opposing side edges so as to define a width;
    a cover, the cover having a second opening dimensioned to bound the front face of the electrical component; and
    a first bracket, the first bracket having at least one attachment structure and an alignment hole, the at least one attachment structure configured to attach to the instrument panel, the electrical component mounted to the first bracket so as to place the electrical component within the first opening, the alignment hole registered to engage the rib, wherein the rib is deformable so as to rotate the position of the front face of the electrical component so as to center the front face within the second opening of the cover.

2. The instrument panel assembly as set forth in claim 1, wherein the front face of the electrical component is generally rectangular, and the second opening of the cover is generally rectangular.

3. The instrument panel assembly as set forth in claim 2, wherein the electrical component is a radio.

4. The instrument panel assembly as set forth in claim 3, wherein the rib includes a body and a pair of wings disposed on opposite sides of the body, wherein one of the pair of wings is widened so as to rotate the front clockwise, and the other of the pair of wings is widened so as to rotate the front face counter-clockwise.

5. The instrument panel assembly as set forth in claim 4, wherein the body includes a pair of side walls, each of the pair of side walls spaced apart from each other, a top wall, a bottom wall and an end wall, the top wall and the bottom wall spaced apart from each other and extending between the pair of side walls, the end wall enclosing an end portion of the body, wherein each of the pair of wings extend outwardly from a respective one of the pair of side walls.

6. The instrument panel assembly as set forth in claim 5, wherein the rib is made of a material suitable for use in an injection molded machine.

7. The instrument panel assembly as set forth in claim 6, wherein the material is a thermoplastic or thermosetting polymers.

8. The instrument panel assembly as set forth in claim 7, further including a second bracket, wherein the first bracket is adjacent a first side edge of the first opening, and the second bracket is adjacent a second side edge of the first opening, wherein the first side edge is opposite the second side edge.

9. A method for assembling an instrument panel assembly, the instrument panel assembly having an instrument panel and a cover, the instrument panel having a first opening configured to house an electrical component having a display, the cover having a second opening dimensioned to bound a front face of the electrical component, the method comprising the steps of:
    providing a first bracket, the first bracket having at least one attachment structure and an alignment hole, the at least one attachment structure configured to attach to the instrument panel;
    mounting the electrical component to the first bracket so as to place the electrical component within the first opening;
    providing a rib on the instrument panel, the rib having a pair of opposing side edges so as to define a width; and
    mounting the cover on the instrument panel and determining if the second opening of the cover is centered with the front face of the electrical component, wherein the width of the rib is lengthened when the second opening is misaligned with the front face of the electrical component so as to center the front face of the electrical component with respect to the second opening.

10. The method as set forth in claim 2, wherein the front face of the electrical component is generally rectangular, and the second opening of the cover is generally rectangular.

11. The method as set forth in claim 3, wherein the electrical component is a radio.

12. The method as set forth in claim 1, wherein the rib includes a body and a pair of wings disposed on opposite sides of the body, wherein one of the pair of wings is widened so as to rotate the front face clockwise, and the other of the pair of wings is widened so as to rotate the front counter-clockwise.

13. The method as set forth in claim 2, wherein the body includes a pair of side walls, each of the pair of side walls spaced apart from each other, a top wall, a bottom wall and an end wall, the top wall and the bottom wall spaced apart from each other and extending between the pair of side walls, the end wall enclosing an end portion of the body, wherein each of the pair of wings extend outwardly from a respective one of the pair of side walls.

14. The method as set forth in claim 2, wherein the rib is made of a material suitable for use in an injection molded machine.

15. The method as set forth in claim 6, wherein the material is a thermoplastic or thermosetting polymers.

16. The method as set forth in claim 4, further including the step of providing a second bracket, wherein the first bracket is adjacent a first side edge of the first opening, and the second bracket is adjacent a second side edge of the first opening, wherein the first side edge is opposite the second side edge.

* * * * *